United States Patent
Liu et al.

(10) Patent No.: US 8,844,383 B2
(45) Date of Patent: Sep. 30, 2014

(54) PRESSURE DETECTION DEVICE

(71) Applicants: Hong Fun Jin Precision Industry (ShenZhen) Co., Ltd., Shenzhen City (CN); Hon Hai Precision Industry Co., Ltd., New Taipei (TW)

(72) Inventors: Wei-Hua Liu, Shenzhen (CN); Yan-Cheng Bao, Shenzhen (CN); Ai-Jun Tang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 112 days.

(21) Appl. No.: 13/626,017

(22) Filed: Sep. 25, 2012

(65) Prior Publication Data

US 2013/0283933 A1  Oct. 31, 2013

(30) Foreign Application Priority Data

Apr. 27, 2012 (CN) .......................... 2012 1 0126678

(51) Int. Cl.
*G01L 1/04* (2006.01)
*G01L 1/00* (2006.01)

(52) U.S. Cl.
USPC ................................. 73/862.621; 73/862.381

(58) Field of Classification Search
USPC ....................................... 73/862.621, 862.381
See application file for complete search history.

(56) References Cited

U.S. PATENT DOCUMENTS

| | | | |
|---|---|---|---|
| 6,598,482 B2* | 7/2003 | Scholz et al. | 73/716 |
| 8,402,836 B2* | 3/2013 | Dannhauer et al. | 73/716 |
| 2002/0014122 A1* | 2/2002 | Bohler et al. | 73/715 |
| 2002/0100330 A1* | 8/2002 | Eickhoff et al. | 73/715 |
| 2002/0194920 A1* | 12/2002 | Scholz et al. | 73/718 |
| 2012/0180574 A1* | 7/2012 | Clegg et al. | 73/862.621 |

* cited by examiner

*Primary Examiner* — Andre Allen
*Assistant Examiner* — Jamel Williams
(74) *Attorney, Agent, or Firm* — Novak Druce Connolly Bove + Quigg LLP

(57) ABSTRACT

A pressure detection device includes a connection seat, a pressure transducer connected to the connection seat, and an overload protection member connected to the connection seat. The pressure transducer includes a housing and a detection sleeve received in the housing. The housing is mounted on the connection seat. The overload protection member is positioned above the detection sleeve. A buffering space is formed between the overload protection member and the detection sleeve, so that the overload protection member can bear an amount of exerted pressure when being overloaded.

20 Claims, 4 Drawing Sheets

PRESSURE DETECTION DEVICE

BACKGROUND

1. Technical Field

The present disclosure relates to a pressure detection device used in a polishing apparatus.

2. Description of Related Art

Polishing robots used for polishing workpieces usually include a robot arm, a pressure detection device and a polisher. The pressure detection device is fixedly positioned between the robot arm and the polisher, for detecting and adjusting a polishing pressure between the polisher and the workpiece during polishing. However, during polishing, if the polishing pressure is overloaded or excessive, the pressure detection device will be deformed excessively, which decreases the lifetime of the pressure detection device.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
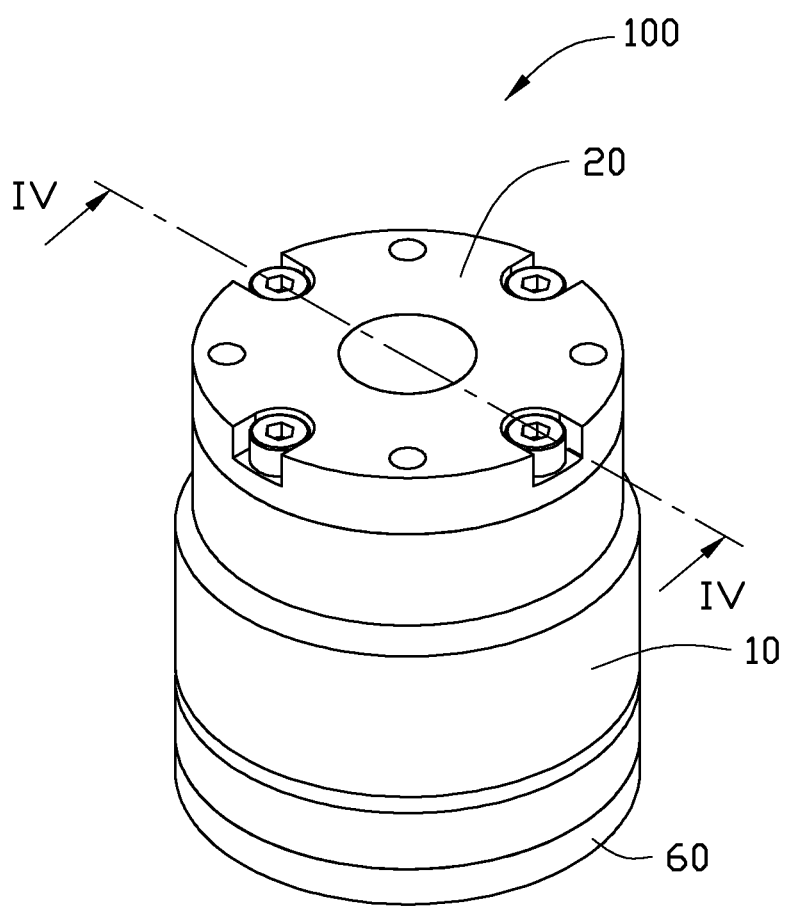
FIG. 1 is an isometric view of a pressure detection device according to an embodiment of the present disclosure including a pressure transducer.
Figure 2:
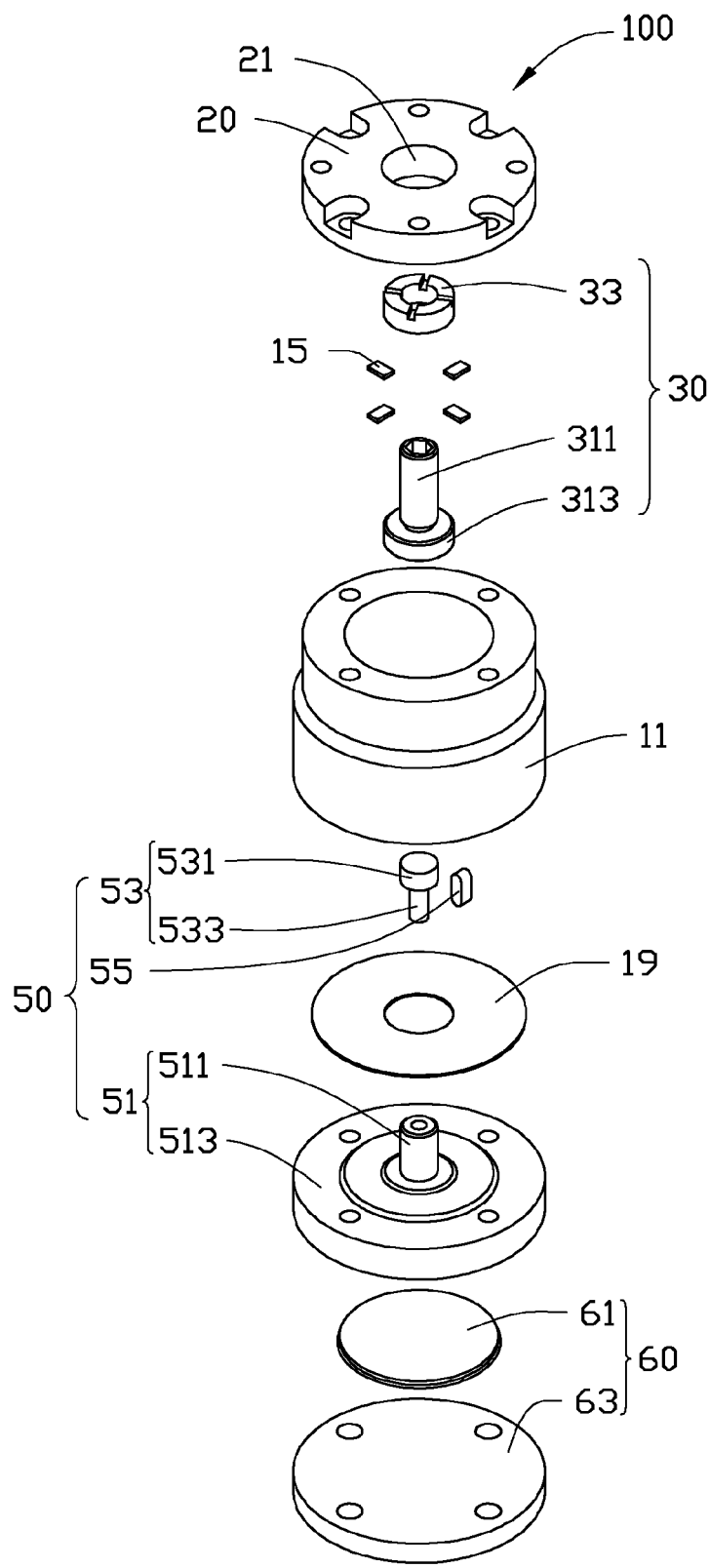
FIG. 2 is an exploded, isometric view of the pressure detection device of FIG. 1.

FIGS. 1 and 2 show one embodiment of a pressure detection device 100. The pressure detection device 100 fixedly interconnects a polishing robot arm (not shown) and a polisher (not shown), for detecting the polishing pressure between the polisher and a workpiece (not shown). The pressure detection device 100 includes a pressure transducer 10, a connection seat 20, an overload protection assembly 30, a transmission assembly 50, and a buffering assembly 60. The connection seat 20 and the transmission assembly 50 are respectively connected to opposite ends of the pressure transducer 10. The overload protection assembly 30 is mounted on the connection seat 20, and is partly received in the pressure transducer 10. The buffering assembly 60 is connected to the transmission assembly 50 away from the pressure transducer 10.

Figure 3:
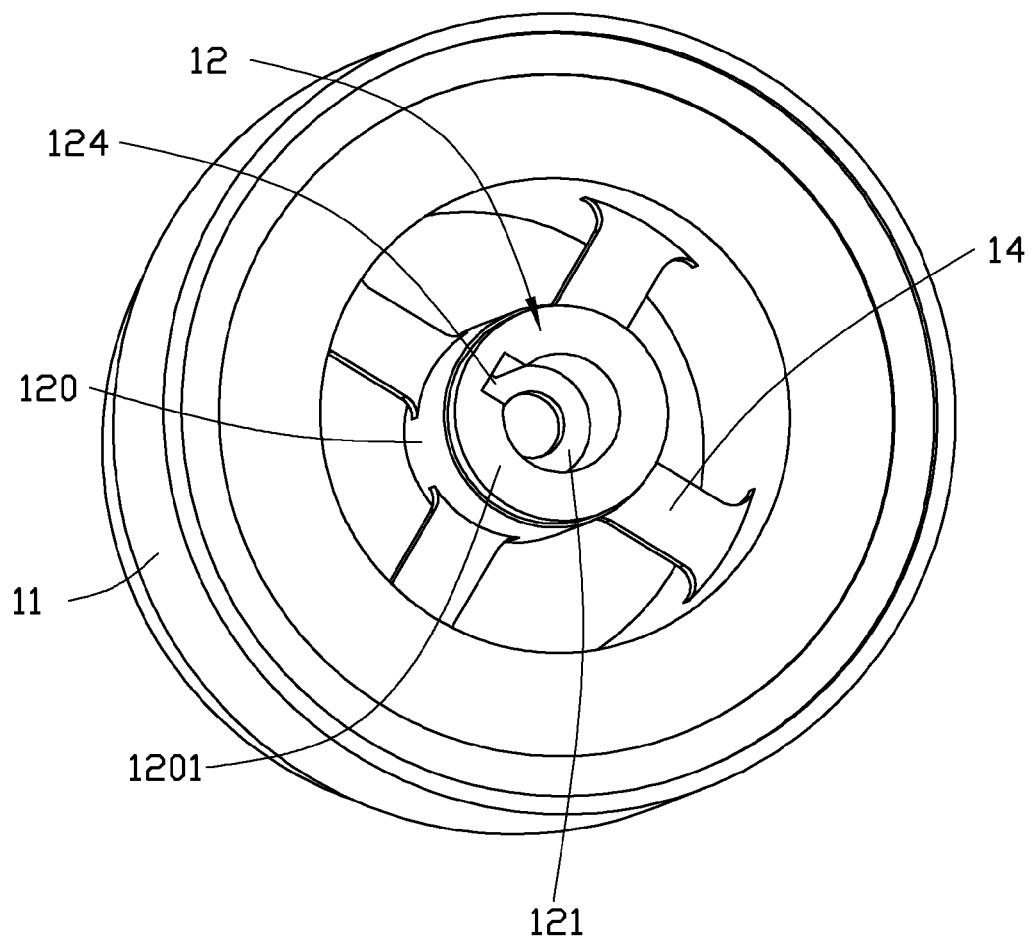
FIG. 3 is an enlarged view of the pressure transducer of FIG. 2.
Figure 4:
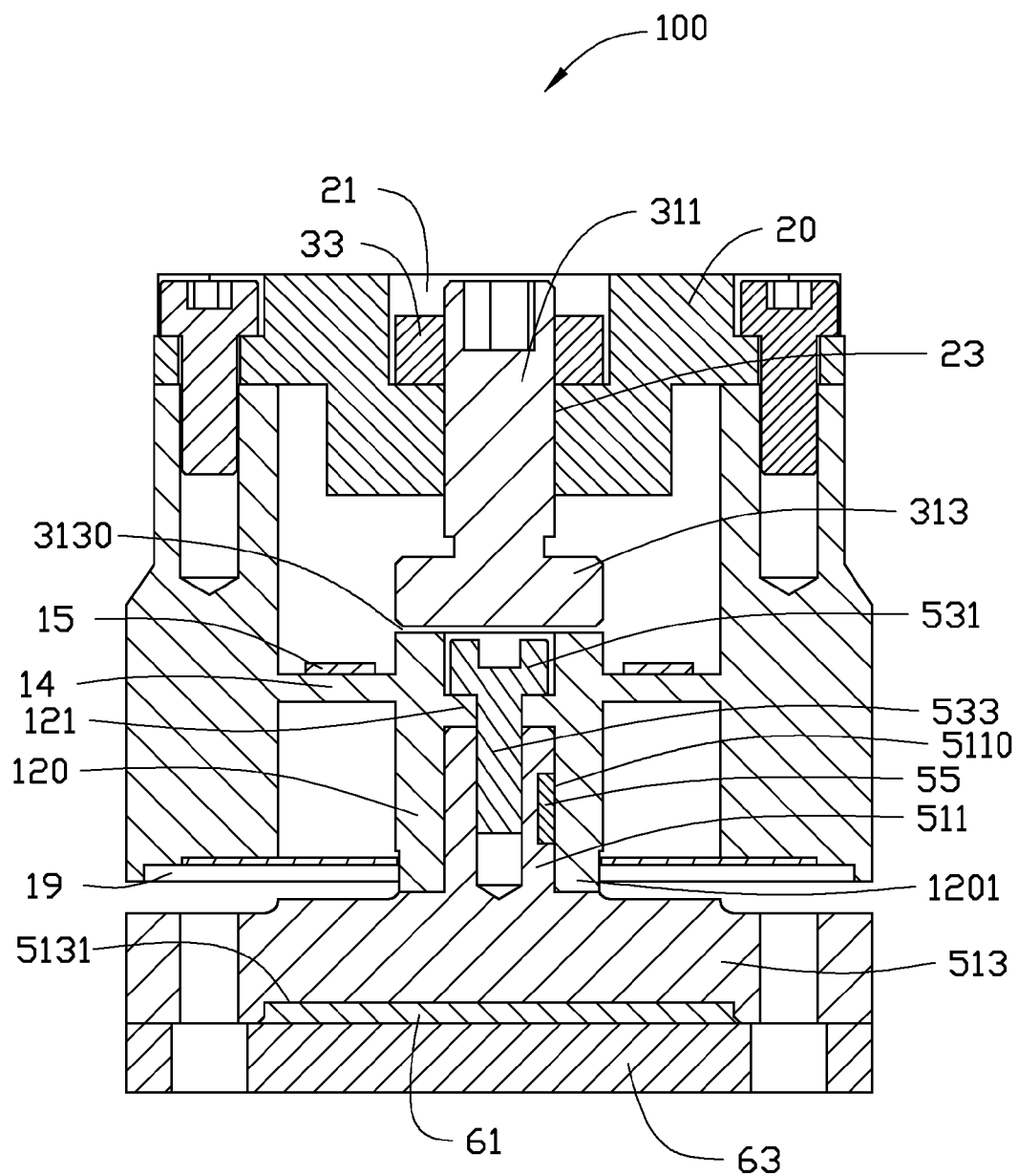
FIG. 4 is a cross-sectional of the pressure detection device of FIG. 1, taken along line IV-IV.

Referring also to FIGS. 3 and 4, the pressure transducer 10 includes a housing 11, a detection sleeve 12, four spokes 14, four sensor elements 15, and a sealing plate 19. The housing 11 is substantially cylindrical. The detection sleeve 12 includes a main body 120 and a stopper portion 121. The main body 120 is also cylindrical, and is coaxially sleeved in the housing 11. The main body 120 includes a protruding end 1201 protruded out from the housing 11. A latching groove 124 is defined on the protruding end 1201. The stopper portion 121 extends out of an inner surface of the main body 120 towards a center of the main body 120. Each spoke 14 extends out of an outer surface of the main body 120 towards the housing 11, and interconnects the housing 11 to the detection sleeve 12. The spokes 14 are evenly spaced from each other.

Each sensor element 15 is placed on one spoke 14 to deform along with the spoke 14 during polishing. A Wheatstone bridge is formed by the sensor elements 15. When the sensor elements 15 deform during polishing, electrical resistance of the sensor elements 15 change accordingly, such that a balance of the Wheatstone bridge is disrupted. Thus, the polishing pressure can be detected. The sealing plate 19 is substantially ring-like. The sealing plate 19 is sleeved on the protruding end 1201 of the detection sleeve 12 and covers an end of the housing 11, for protecting the pressure transducer 10 from dust. In another embodiment, a center of the main body 120 can be deviated to a center of the housing 11, and therefore, a deviation compensation should be considered when detecting.

The connection seat 20 is connected to one end of the housing 11 away from the sealing plate 19. A mounting groove 21 is defined on a top surface of the connection seat 20. A through hole 23 is defined on a bottom surface of the mounting groove 21. In another embodiment, the connection seat 20 and the housing 11 can be integrally formed.

The overload protection assembly 30 is mounted on the connection seat 20, and includes an overload protection member 313, an adjustment bolt 311 and a fixing element 33. The overload protection member 313 is connected to one end of the adjustment bolt 311. The overload protection member 313 is received in the housing 11 and positioned above the detection sleeve 12, such that a buffering space 3130 is formed between the overload protection member 313 and the detection sleeve 12. The other end of the adjustment bolt 311 passes through the through hole 23 of the connection seat 20, and is received in the mounting groove 21. The fixing element 33 is fixedly screwed with the other end of the adjustment bolt 311 and received in the mounting groove 21. A distance of the buffering space 3130 can be adjusted by the fixing element 33, and then a load range of the pressure detection device 100 can be adjusted. In the illustrated embodiment, an anaerobic adhesive is filled in the mounting groove 21 for joining the adjustment bolt 311, the fixing element 33, and the connection seat 20 together. When the polishing pressure is exceeding the load range, the overload protection member 313 can bear or handle an amount of pressure being exerted, and the anaerobic adhesive can absorb the amount of shocks caused by the polisher. In another embodiment, the fixing element 33 can be omitted, and then an inner wall of the through hole 23 is threaded and is engaged with the adjustment bolt 311.

The transmission assembly 50 is used for transmitting a reacting force of the polishing force to the pressure transducer 10, so that the pressure transducer 10 can detect the polishing pressure. The transmission assembly 50 includes a transmission member 51, a fixing member 53, and a latching member 55. The transmission member 51 includes a connection portion 511 and a mounting portion 513. The connection portion 511 is substantially a hollow cylinder. An engaging groove 5110 is defined on a side surface of the connection portion 511. One end of the connection portion 511 is inserted into the main body 120 of the detection sleeve 12. The mounting portion 513 is connected to one end of the connection portion 511 away from the detection sleeve 12. A receiving groove 5131 is defined on an end surface of the mounting portion 513 away from the connection portion 511. The fixing member 53 includes a fixing portion 533 and a resisting portion 531 connected to the fixing portion 533. The fixing portion 533 is inserted into the stopper portion 121 of the detection sleeve 12 and the connection portion 511 of the transmission member 51. The resisting portion 531 is received in the detection sleeve 12, and is fixed to the stopper portion 121 of the detection sleeve 12. The latching member 55 is latched in the latching groove 124 of the detection sleeve 12 and the engaging groove 5110 of the transmission member 51, for preventing the connection portion 511 from rotating relatively to the detection sleeve 12.

In the illustrated embodiment, the mounting portion 513 is fixed to the detection sleeve 12 by welding. The resisting portion 531 is fixed to the stopper portion 121 by anaerobic adhesive. The transmission assembly 50 is reliably fixed to the detection sleeve 12, such that a negative affect caused by bending moment and torsion moment during polishing can be defused effectively. Thus, the lifetime of the pressure transducer 10 can be prolonged, and the detection precision of the pressure transducer 10 can be improved.

The buffering assembly 60 is mounted on one end of the mounting portion 513 of the transmission assembly 50 away from the connection portion 511, and includes a first buffering member 61 and a second buffering member 63. The first buffering member 61 is received in the receiving groove 5131. The second buffering member 63 covers the receiving groove 5131, and is fixed to the first buffering member 61 and the mounting portion 513. In the illustrated embodiment, the first buffering member 61 is made of gel. The second buffering member 63 is made of rubber. The second buffering member 63 is fixed to the first buffering member 61 and the mounting portion 513 by an adhesive. The buffering assembly 60 can absorb shocks caused by the polisher, so that the detection precision of the pressure transducer 10 can be improved.

In assembly, firstly, four sensor elements 15 are respectively mounted on the spokes 14. Secondly, the latching member 55 is fixed into the engaging groove 5110 of the transmission member 51, and then the transmission member 51 is inserted into the detection sleeve 12, and the latching member 55 is latched in the latching groove 124. Thirdly, the fixing portion 533 is inserted into the stopper portion 121 of the detection sleeve 12 and the connection portion 511 of the transmission member 51, and then the resisting portion 531 is fixed to the stopper portion 121 by anaerobic adhesive, such that the pressure transducer 10 and the transmission assembly 50 are fixed together. Fourthly, the adjustment bolt 311 connected with the overload protection member 313 passes through the through hole 23 of the connection seat 20, and is received in the mounting groove 21. The fixing element 33 is fixed to the adjustment bolt 311 by anaerobic adhesive, and is received in the mounting groove 21. And then the connection seat 20 is fixed to the housing 11 to make the overload protection element 313 to be above the detection sleeve 12. Finally, the buffering assembly 60 is mounted on one end of the mounting portion 513 of the transmission assembly 50 opposite to the connection portion 511.

In use, the connection seat 20 is connected to the robot arm, and the second buffering member 63 is connected to the polisher. During polishing, the detection sleeve 12 deforms towards the overload protection member 313, and the spokes 14 and the sensor elements 15 deform with the detection sleeve 12, such that electrical resistance of the sensor elements 15 is changed. Thus, the electrical resistance changes disrupt the balance of the Wheatstone bridge formed by the sensor elements 15, and the polishing pressure can be detected. If the polishing pressure is overloaded, the detection sleeve 12 may resist against the overload protection member 313, such that the overload protection member 313 bears the overloaded pressure to protect the detection sleeve 12. Thus, the lifetime or lifespan of the pressure detection device 100 can be prolonged.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A pressure detection device, comprising:
a connection seat;
a pressure transducer connected to the connection seat, the pressure transducer comprising a housing mounted on the connection seat and a detection sleeve received in the housing; and
an overload protection member mounted on the connection seat, wherein the overload protection member is received in the housing and positioned above the detection sleeve, and a buffering space is formed between the overload protection member and the detection sleeve, so that the overload protection member is capable of bearing an amount of exerted pressure when being overloaded.

2. The pressure detection device of claim 1, wherein the pressure detection device further comprises an adjustment bolt adjustably fixed to the connection seat, and the overload protection member is connected to one end of the adjustment bolt away from the pressure transducer.

3. The pressure detection device of claim 2, wherein the pressure detection device further comprises a fixing element, a mounting groove is defined on a top surface of the connection seat, a through hole is defined on a bottom surface of the mounting groove, one end of the adjustment bolt passes through the through hole and is received in the mounting groove, the fixing element is fixedly screwed with the adjustment bolt and is received in the mounting groove, and an anaerobic adhesive is filled in the mounting groove for joining the adjustment bolt, the fixing element, and the connection seat together.

4. The pressure detection device of claim 2, wherein a through hole is defined on the connection seat, one end of the adjustment bolt passes through the through hole, and an inner wall of the through hole is threaded and is engaged with the adjustment bolt.

5. The pressure detection device of claim 1, wherein the pressure detection device further comprises a transmission member fixed to one end of the housing away from the connection seat.

6. The pressure detection device of claim 5, wherein the pressure detection device further comprises a fixing member comprising a fixing portion and a resisting portion connected to the fixing portion, the detection sleeve comprises a main body and a stopper portion, the stopper portion extends out of an inner surface of the main body towards a center of the main body, the transmission member comprises a connection portion, the connection portion is inserted into the main body, the fixing portion is inserted into the stopper portion and the connection portion, and the resisting portion is received in the detection sleeve and fixed to the stopper portion.

7. The pressure detection device of claim 6, wherein the main body comprises a protruding end protruded out from the housing, a latching groove is defined on the protruding end, an engaging groove is defined on a side surface of the connection portion, and the pressure detection device further comprises a latching member latched in the latching groove and the engaging groove.

8. The pressure detection device of claim 6, wherein the resisting portion is fixed to the stopper portion by an anaerobic adhesive.

9. The pressure detection device of claim 6, wherein the transmission member further comprises a mounting portion connected with the connection portion away from the detection sleeve, a receiving groove is defined on an end surface of the mounting portion away from the connection portion, and the pressure detection device further comprises a first buffering member received in the receiving groove.

10. The pressure detection device of claim 9, wherein the pressure detection device further comprises a second buffering member covering the receiving groove, and the second buffering member is fixed to the first buffering member and the mounting portion.

11. The pressure detection device of claim 10, wherein the first buffering member is made of gel, and the second buffering member is made of rubber.

12. The pressure detection device of claim 1, wherein the pressure transducer further comprises a sealing plate covering an end of the housing away from the connection seat, for protecting the pressure transducer from dust.

13. A pressure detection device, comprising:
a connection seat;
a pressure transducer connected to the connection seat, the pressure transducer comprising a housing mounted on the connection seat and a detection sleeve received in the housing;
an overload protection member mounted on the connection seat, wherein the overload protection member is received in the housing and positioned above the detection sleeve, and a buffering space is formed between the overload protection member and the detection sleeve, so that the overload protection member is capable of bearing an amount of exerted pressure when being overloaded;
an adjustment bolt adjustably fixed to the connection seat, wherein the overload protection member is connected to one end of the adjustment bolt away from the pressure transducer; and
a transmission member fixed to one end of the housing away from the connection seat.

14. The pressure detection device of claim 13, wherein the pressure detection device further comprises a fixing element, a mounting groove is defined on a top surface of the connection seat, a through hole is defined on a bottom surface of the mounting groove, one end of the adjustment bolt passes through the through hole and is received in the mounting groove, the fixing element is fixedly screwed with the adjustment bolt and is received in the mounting groove, and an anaerobic adhesive is filled in the mounting groove for joining the adjustment bolt, the fixing element, and the connection seat together.

15. The pressure detection device of claim 13, wherein the pressure detection device further comprises a fixing member comprising a fixing portion and a resisting portion connected to the fixing portion, the detection sleeve comprises a main body and a stopper portion, the stopper portion extends out of an inner wall of the main body towards a center of the main body, the transmission member comprises a connection portion, the connection portion is inserted into the main body, the fixing portion is inserted into the stopper portion and the connection portion, and the resisting portion is received in the detection sleeve and fixed to the stopper portion.

16. The pressure detection device of claim 15, wherein the main body comprises a protruding end protruded from the housing, a latching groove is defined on the protruding end, an engaging groove is defined on a side surface of the connection portion, the pressure detection device further comprises a latching member latched in the latching groove and the engaging groove.

17. The pressure detection device of claim 15, wherein the resisting portion is fixed to the stopper portion by an anaerobic adhesive.

18. The pressure detection device of claim 15, wherein the transmission member further comprises a mounting portion connected with the connection portion away from the detection sleeve, a receiving groove is defined on an end surface of the mounting portion away from the connection portion, and the pressure detection device further comprises a first buffering member received in the receiving groove.

19. The pressure detection device of claim 18, wherein the pressure detection device further comprises a second buffering member covering the receiving groove, and the second buffering member is fixed to the first buffering member and the mounting portion.

20. The pressure detection device of claim 19, wherein the first buffering member is made of gel, and the second buffering member is made of rubber.

* * * * *